United States Patent [19]

Wolf et al.

[11] Patent Number: 4,937,303

[45] Date of Patent: Jun. 26, 1990

[54] SOLUTION POLYMERIZATION FOR THE PREPARATION OF GEL-FREE ETHYLENE/VINYL ACETATE COPOLYMERS

[75] Inventors: Bernhard A. Wolf, Mainz; Bernhard Will, Wiesbaden; Werner Obrecht, Moers; Rudolf Casper, Leverkusen; Wolfgang Baade, Dormagen; Gerd Sylvester, Leverkusen; Kurt-Peter Meurer, Koenigswinter; Hugo Zimmermann, Cologne, all of Fed. Rep. of Germany

[73] Assignee: Bayer Aktiengesellschaft, Leverkusen, Fed. Rep. of Germany

[21] Appl. No.: 345,422

[22] Filed: May 1, 1989

[30] Foreign Application Priority Data

May 10, 1988 [DE] Fed. Rep. of Germany ....... 3815946

[51] Int. Cl.$^5$ ................................................ C08F 2/06

[52] U.S. Cl. ................................ 526/212; 526/331; 526/330; 526/65; 526/73

[58] Field of Search ................ 526/331, 212, 61, 330, 526/65, 73

[56] References Cited

U.S. PATENT DOCUMENTS

3,325,460  6/1967  Schellenberg et al. ............. 526/331

FOREIGN PATENT DOCUMENTS

1495660  1/1957  Fed. Rep. of Germany ...... 526/331

Primary Examiner—Joseph L. Schofer
Assistant Examiner—Tom Weber
Attorney, Agent, or Firm—Connolly and Hutz

[57] ABSTRACT

High molecular weight, gel-free ethylene/vinyl acetate copolymers may be prepared by the process of solution polymerization if a particular relationship of temperature/pressure is observed.

4 Claims, No Drawings

SOLUTION POLYMERIZATION FOR THE PREPARATION OF GEL-FREE ETHYLENE/VINYL ACETATE COPOLYMERS

This invention relates to an intermittent or preferably continuous process for the preparation of ethylene/vinyl acetate (EVA) copolymers by radical copolymerisation of the monomers in tertiary butanol under special conditions of pressure and temperature, by which gel-free products may be obtained.

EVA copolymers may be prepared in almost any statistical composition by radical copolymerisation of the monomers.

Ethylene/vinyl acetate copolymers [see H. Bucka, R. Nitzsche, H. Onderka, Plaste und Kautschuk 30, (6), 302,305 (1983)] containing a low proportion of copolymerisable vinyl acetate (hereinafter referred to as "vinyl acetate content" or "VA content") can be prepared economically by high pressure polymerisation. Copolymers with a vinyl acetate content of up to not more than 50% by weight may be prepared particularly economically and with advantageous properties by the conventional mass high pressure polymerisation process. This polymerisation is generally carried out at pressures of from 1000 to 2500 bar and at temperatures from 150° to 280° C. The high pressure process is, however, unsuitable for the preparation of EVA copolymers with relatively high VA contents since it is difficult ro obtain copolymers with a high molecular weight and high Mooney viscosity at the polymerisation temperatures required for this process.

EVA copolymers with VA contents of more than 70% by weight are predominantly prepared by emulsion polymerisation. It is precisely this process, however, which results in products with a very high gel content, which are unusable as elastomeric solid rubbers because they are difficult to process. Although a process for the preparation of elastomeric ethylene/vinyl acetate copolymers with a high Mooney viscosity and low gel content is described in DE-OS No. 3 000 009, the polymers obtained by this process are emulsion copolymers which have a copolymerised vinyl acetate content of from 40 to 70% by weight and are obtained from aqueous solutions by coagulation of an ethylene/vinyl acetate copolymer latex.

The properties of these ethylene/vinyl acetare copolymers are determined by residues of emulsifier which cannot be completely removed and which render the copolymers unusable for numerous applications.

EVA copolymers having a VA content of at least 30% by weight may also be obtained by a process of solution polymerisation at medium pressures. The solvents used for this process may be, for example, tert.-butanol or mixtures of tert.-butanol, methanol and hydrocarbons in which the polymers remain in solution even during the polymerisation process (DE-AS Nos. 11 26 613, 11 26 614 and 14 95 767, DE-OS No. 33 23 531, GB-PS No. 807 112 and 843 974, FR-PS Nos. 1 189 387, 1 225 704 and 1 238 589, and U.S. Pat. Nos. 2,396,785 and 2,947,735). This process gives rise to high molecular weight, slightly branched copolymers.

The solution polymerisation process is generally carried out in a cascade of from 3 to 10 reactors, using tert.-butanol as solvent at temperatures from 50 to 130° C. and a pressure from 50 to 400 bar in the presence of radical forming substances such as organic peroxides or azo compounds as polymerisation initiators. The process gives rise to high molecular weight, elastomeric copolymers with a low gel content and VA contents of from 30 to 75% by weight. The gel content, which has hitherto not been avoidable, interferes with the properties of the copolymers obtained and of the resulting vulcanisates. These unwanted gelatine components can be detected visually as spots.

It has now surprisingly been found that high molecular weight EVA copolymers which are free from gel and therefore free from spots may be prepared by solution polymerisation under selected conditions of pressure and temperature.

This invention relates to a process for the preparation of gel-free ethylene/vinyl acetate copolymers having VA contents of from 30 to 92% by weight, preferably from 40 to 70% by weight, by the solution polymerisation of ethylene and vinyl acetate in tert.-butanol at temperatures from 30° to 120° C., preferably from 50° to 90° C., and pressures from 200 to 1000 bar, a minimum pressure corresponding to the following formula $$p = 1.1 \left[ -204.2 + 9.12 \cdot [E] - 48 [E]/[VA] + 44 \left[ \frac{(E)}{(VA)} \right]^2 + 1.12 \cdot T \right] \text{bar}$$

where
- [E] denotes the copolymerised ethylene content in the end product in % by weight,
- [VA] denotes the VA content in the end product in % by weight and
- T denotes the polymerisation temperature in [°C.] being maintained at least from time to time in the course of polymerisation, preferably when conversion is in the range of from 3 to 20% (based on the vinyl acetate put into the process).

The pressure of p or more should in practice be maintained at least over the whole conversion range of from 3 to 20%. As shown in the above formula, the minimum pressure p depends on the VA content of the copolymer to be prepared. Thus, for example, for copolymers having VA contents of from 45 to 92% by weight, it is sufficient to maintain the minimum pressure p over the conversion range of from 3 to 12% and for copolymers with VA contents of from 30 to less than 45% by weight it is sufficient to maintain the minimum pressure over the conversion range of from 8 to 20%. At higher conversion rates, the minimum pressure may be somewhat reduced and the permissible amount by which it may be reduced can easily be determined experimentally in each case if desired. As soon as the gel content of the copolymers obtained increases, the pressure has fallen below the required minimum pressure. For the sake of the greatest simplicity of procedure, one would generally keep the pressure constant over the whole conversion range.

The process according to the invention may be carried out e.g. in a high pressure stirrer autoclave. In the continuous process, which is preferred, at least four reactors are generally employed.

The quantity of tert.-butanol to be used is from 10 to 300% by weight, preferably from 40 to 200% by weight, based on the vinyl acetate used.

The final conversion is normally from 30 to 90%, preferably from 35 to 80%, based on the vinyl acetate put into the process.

The dwell time required is normally from 3 to 18 hours and decreases with increasing VA content. Thus the dwell time for types with a high VA content is from 3 to 8 hours and for types with a low VA content from 8 to 18 hours.

Radical formers which have a decomposition half life of from 30 to 220 minutes at a temperature of 65° C. may be used as polymerisation initiators. Preferred examples of such radical formers include organic peroxides such as benzoyl peroxide, lauroyl peroxide and dichlorobenzoyl peroxide, azo compounds such as azodiisobutyronitrile and especially peresters such as alkyl perpivalates, e.g. tert.-perpivalate and tert.-amylperpivalate, and percarbonates such as diisopropylperoxydicarbonate and dicyclohexylperoxydicarbonate. The polymerisation initiators are generally used in quantities of from 0.01 to 1.5% by weight, preferably from 0.1 to 1% by weight, based on the monomers put into the process.

Regulators are generally not required in view of the regulating effect of vinyl acetate and the transfer reaction by the solvent. In exceptional cases, however, molecular weight regulators are used for obtaining a low molecular weight. These regulators may be ketones such as acetone or diethylketone aldehydes such as propionaldehyde or hydrocarbons such as propene or isooctane and may be used in quantities of from 50 to 2000 ppm, preferably from 100 to 1000 ppm, based on the quantity of monomers used.

The gel-free copolymers prepared according to the invention generally have Mooney viscosities according to DIN 53 523 of from 15 to 40 ml (1+4) 100° C., molecular weights $\overline{M}_w$ determined as weight average molecular weights of from 150,000 to 1,000,000, preferably from 200,000 to 500,000 (determined by light scattering) and molecular weights $\overline{M}_n$ determined as number average molecular weights of from 15,000 to 200,000, preferably from 22,000 to 70,000 (determined by membrane osmometry in toluene). The dispersion index $\overline{M}_w/\overline{M}_n$ is generally from 2 to 15.

"Gel free" in the context of this invention means that after 24 hours extraction with methylene chloride in a Soxhlet attachment, not more than 0.2% by weight of insoluble residue is left, based on the copolymer.

The copolymers prepared according to the invention may be used in the cured or uncured stare. Preferred examples of their use in the uncured state includes their use as flow improvers for lubricants and hydraulic oils (e.g. medium fraction distillates according to DIN 7728 T1), as adhesive binders, in particular for hot melt adhesives, and as (plasticizing) mixture components for thermoplasts and duroplasts. The quantities used depend on the purpose. Thus flow improvers may contain 1% by weight or more and hot melt adhesives up to 100% by weight of the copolymers prepared according to the invention.

Examples of suitable thermoplasts and duroplasts include PVC, polymethylmethacrylate, styrene copolymers including ABS, acrylonitrile copolymers, polyvinylidene chloride, polyesters including polycarbonates, polyamides, polyvinylacetates, polyphenylenesulphide, polyethylene and thermoplastic polyesters such as polyalkylene terephthalates: unsaturated polyester resins and phenol/form-aldehyde condensates and amine-formaldehyde condensates.

The copolymers prepared according to the invention are used in the cured form for most applications. Curing is preferably brought about by peroxides. "Cured" in the context of this invention means that after 10 hours' extraction in a Soxhlet attachment with toluene as extractant, less than 5% by weight, preferably less than 2% by weight, based on the copolymer, can be extracted. One important use of cured copolymers prepared according to the invention is as mixture component for other rubbers, e.g. rubber-like homopolymers and copolymers of butadiene, isoprene, chloroprene, acrylonitrile, vinyl acetate, esters of acrylic or methacrylic acid and $C_1$–$C_8$ monohydric or dihydric alcohols as well as vinyl chloride and ethylene.

For these applications, the quantities of copolymers prepared according to the invention may vary within wide limits, e.g. from 1 to 99% by weight, preferably from 10 to 90, especially from 10 to 40 or from 60 to 90% by weight, based on the mixture.

The copolymers may be added in the cured state but are in most cases added in the uncured state to as yet uncured rubbers and the two are then cured together.

This last embodiment may also be applied to the mixture with thermoplasts, e.g. with ethylene/vinyl acetate copolymers having VA contents of from 1 to less than 30% by weight.

These cured copolymers prepared according to the invention may be used as such or in the form of the mixtures described above for the production of moulded articles, sheet products and coatings of all types, e.g. for the manufacture of cable sheaths, cable lines, insulations, transport belts, force transmitting elements and flexible tubes.

The percentages given in the following Examples refer to the weight; parts are parts by weight.

EXAMPLES

EXAMPLE 1

A cascade of six high pressure stirrer autoclaves connected in series with capacities from 4 to 6 m³ is continuously filled with 1520 kg/h of ethylene and 1150 kg/h of a mixture consisting of 4 parts of vinyl acetate and 6 parts of tert.-butanol and 132 kg/h of a solution of 19.1 kg of dicyclohexyl peroxydicarbonate in a mixture of 450 kg of vinyl acetate and 850 kg of tert.-butanol. The reaction temperatures have a profile of 60 to 75° C. at a pressure of 720 bar. Unused ethylene is discharged. A gel-free copolymer having the following properties is obtained:

| | |
|---|---|
| Conversion: | 68% |
| VA content: | 31% |
| $\overline{M}_w$: | 223,000 |
| $\overline{M}_n$: | 28,000 |
| 22 ML (1 + 4) | 100° C. |
| $T_1 = 60°$ C., $T_2 = 65°$ C., $T_3 = 68°$ C., | |
| $T_4 = 72°$ C., $T_5 = 72°$ C., $T_6 = 75°$ C. | |

EXAMPLE 2

Example 1 is repeated except that the profile of the reaction temperatures $T_1$–$T_6$ is from 60° to 78° C. and an operating pressure of 550 bar is employed. The cascade is continuously filled with 1450 kg/h of ethylene, 1928 kg/h of a mixture of 36 parts of vinyl acetate and 64 parts of tert.-butanol and 177 kg/h of a mixture of 361 kg of vinyl acetate, 641 kg of tert.-butanol and 7.4 kg of tert.-butylperpivalate. A gel-free copolymer having the following properties is obtained:

| | |
|---|---|
| Conversion: | 64% |
| VA content: | 40% |
| $\overline{M}_w$: | 249,000 |
| $\overline{M}_n$: | 25,000 |
| 23 ML (1 + 4) | 100° C. |
| $T_1 = 60°$ C., $T_2 = 65°$ C., $T_3 = 68°$ C., | |
| $T_4 = 72°$ C., $T_5 = 75°$ C., $T_6 = 78°$ C. | |

EXAMPLE 3

Example 1 is repeated except that the profile of the reaction temperatures $T_1$–$T_6$ is from 55°–70° C. and a pressure of 500 bar is employed. The cascade is continuously filled with 1180 kg/h of ethylene, 1928 kg/h of a mixture of 36 parts of vinyl acetate and 64 parts of tert.-butanol and 177 kg/h of a solution of 12.2 kg of dicyclohexylperoxydicarbonate in a mixture of 361 kg of vinyl acetate and 641 kg of tert.-butanol. The gel-free copolymer obtained has the following properties:

| | |
|---|---|
| Conversion: | 75% |
| VA content: | 45% |
| $\overline{M}_w$: | 320,000 |
| $\overline{M}_n$: | 35,000 |
| 25 ML (1 + 4) | 100° C. |
| $T_1 = 55°$ C., $T_2 = 60°$ C., $T_3 = 64°$ C., | |
| $T_4 = 66°$ C., $T_5 = 68°$ C., $T_6 = 70°$ C. | |

EXAMPLE 4

Example 1 is repeated except that 5 reactors connected in series are employed and the profile of the reaction temperatures $T_1$–$T_5$ is from 55° to 70° C. at an operating pressure of 400 bar. The cascade is continuously filled with 1140 kg/h of ethylene, 1700 kg/h of a mixture of equal parts of tert.-butanol and vinyl acetate and 122 kg/h of an initiator solution consisting of 410 kg of vinyl acetate, 790 kg of tert.-butanol and 19.5 kg of dicyclohexylperoxydicarbonate. The gel-free copolymer obtained has the following properties:

| | |
|---|---|
| Conversion: | 78% |
| VA content: | 50% |
| $\overline{M}_w$: | 244,000 |
| $\overline{M}_n$: | 28,000 |
| 25 ML (1 + 4) | 100° C. |
| $T_1 = 55°$ C., $T_2 = 62°$ C., $T_3 = 66°$ C., | |
| $T_4 = 68°$ C., $T_5 = 70°$ C. | |

EXAMPLE 5

Example 1 is repeated except that four reactors are used in series and the profile of the reaction temperatures $T_1$–$T_4$ is from 60°–78° C. at an operating pressure of 400 bar. The cascade is continuously filled with 900 kg/h of ethylene and 2160 kg/h of a mixture of equal parts of vinyl acetate and tert.-butanol and 131 kg/h of a solution of 11.7 kg of tert.-butylperpivalate in a mixture of 468 kg of vinyl acetate and 832 kg of tert.-butanol. The gel-free copolymer obtained has the following properties:

| | |
|---|---|
| Conversion: | 74% |
| VA content: | 59% |
| $\overline{M}_w$: | 300,000 |
| $\overline{M}_n$: | 32,000 |
| 26 ML (1 + 4) | 100° C. |
| $T_1 = 60°$ C., $T_2 = 66°$ C., $T_3 = 72°$ C., $T_4 = 78°$ C. | |

The products of the above Examples are compared in the following Table with EVA copolymers prepared under conventional conditions.

| | VA content [% by wt.] | [E]/[VA] | T [°C.] | p [bar] | Gel content [% by wt.] | Minimum pressure according to the invention [bar] |
|---|---|---|---|---|---|---|
| Ex. | | | | | | |
| 1 | 30 | 2.33 | 60–75 | 720 | <0.2 | 691.9–710.4 |
| 2 | 40 | 1.5 | 60–78 | 550 | <0.2 | 480.9–503.1 |
| 3 | 45 | 1.22 | 55–70 | 500 | <0.2 | 406.7–425.2 |
| 4 | 50 | 1.0 | 55–70 | 400 | <0.2 | 340.3–358.8 |
| 5 | 60 | 0.66 | 60–78 | 400 | <0.2 | 236.9–259.2 |
| Comparison | | | | | | |
| 1 | 30 | 2.33 | 80–95 | 300 | 2.7 | 716.5–735.0 |
| 2 | 40 | 1.5 | 75–90 | 250 | 3.2 | 499.4–517.9 |
| 3 | 45 | 1.22 | 65–80 | 300 | 1.9 | 419.0–437.5 |
| 4 | 50 | 1.0 | 70–90 | 250 | 1.7 | 358.8–383.5 |
| 5 | 60 | 0.66 | 65–80 | 200 | 1.2 | 243.1–261.6 |

We claim:

1. Process for the preparation of gel-free ethylene/vinyl acetate copolymers having VA contents of from 30 to 92% by weight by solution polymerisation of ethylene and vinyl acetate in tert.-butanol at temperatures from 30° to 120° C. and pressures from 200 to 1000 bar, a minimum pressure corresponding to the following formula $$p = 1.1\left[-204.2 + 9.12 \cdot [E] - 48\,[E]/[VA] + 44\left[\frac{(E)}{(VA)}\right]^2 + 1.12 \cdot T\right] \text{bar}$$

where
[E] denotes the copolymerised ethylene content in the end product in % by weight,
[VA] denotes the VA content in the end product in % by weight and T denotes the polymerisation temperature in [° C.] being maintained at least from time to time during the polymerisation.

2. Process according to claim 1 for the preparation of copolymers having VA contents of from 40 to 70% by weight.

3. Process according to claims 1 at temperatures from 50° to 90° C.

4. Process according to claim 1, in which the minimum pressure according to claim 1 is maintained over the conversion range of from 3 to 20%.

* * * * *